W. F. BLANDIN.
Corn-Planter.

No. 40,900. Patented Dec. 15, 1863.

WITNESSES:
W. E. Mans
A. C. Ballard

INVENTOR
Wm. F. Blandin

UNITED STATES PATENT OFFICE.

WILLIAM F. BLANDIN, OF MACOMB, ILLINOIS.

IMPROVEMENT IN CORN-PLANTERS.

Specification forming part of Letters Patent No. 40,900, dated December 15, 1863.

*To all whom it may concern:*

Be it known that I, WILLIAM F. BLANDIN, of Macomb, in the county of MacDonough and State of Illinois, have invented certain new and useful Improvements in Automatic Corn-Planters; and I do hereby declare that the following is a full, clear, and exact description thereof, reference being had to the accompanying drawings, and the letters and figures marked thereon, which form part of this specification—

Figure 1:
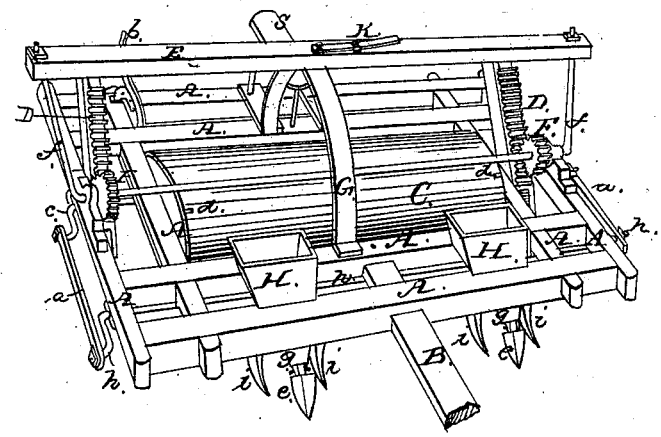
Figure 2:
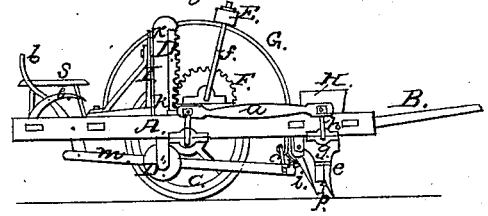
Figure 4:
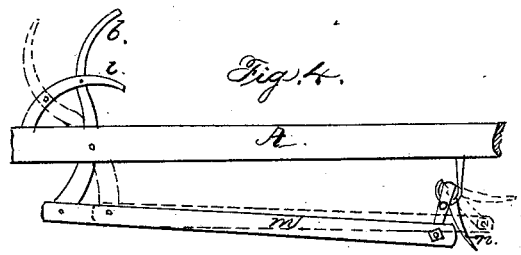
Figure 3:
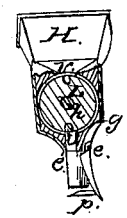

In the said drawings, which are hereunto annexed, Figure 1 represents a perspective view of my improvement in corn-planters. Fig. 2 shows a side view of the same, and Fig. 3 shows a side sectional view of the hopper H and the attachments thereto.

The nature of my invention consists in having a corn-planting machine so constructed that the corn may be dropped automatically; that by a novel arrangement the machine may be readily adjusted so as to be turned about at the end of the row with facility, and that what is commonly called "planting in check-rows" may be accomplished without the trouble of marking or checking off the field before planting the same, and in other particulars, hereinafter to be fully described.

To enable those skilled in the art to construct and use my invention, I will now proceed to describe the same with particularity.

A in the annexed drawings represents the frame-work of my improved corn-planter, which is made of timber of suitable dimensions, and constructed substantially as shown in the drawings. B represents the draft-pole, which passes through the front cross-beam of the machine, and is fastened to the second by a screw or bolt, so as to be readily removed when desired.

C represents a roller, which is used, in connection with my corn-planter, mainly for two purposes: first, to operate the device for dropping the corn, and, second, to roll the ground, and thus save the labor and expense of going over the ground a second time for the purpose of rolling the same. This roller is constructed in the form of a hollow cylinder, as a solid roller of the requisite size would be so heavy as to impede the successful operation of the machine. I also cover the convex surface of the roller with some suitable polished metal plates to prevent the soil from sticking thereto and accumulating upon it, so as to interfere with its regular and equal rotation. Each end of the shaft marked $c$, upon which the aforesaid roller is fixed so as to revolve with it, after passing through suitable bearings in the frame A, is bent so as to form a crank, as shown in the drawings, as also are the ends of the shaft $h$, which passes through or beneath the hoppers marked H H. These two cranks $c$ and $h$ are connected by the rod or bar $a$, so that the revolution of the roller C, as the machine is moved over the ground, causes the shaft $h$ to revolve also, for the purposes hereinafter to be described. The direction in which the cranks at the opposite ends of each of the said shafts are bent is at right angles with each other, so that if there should be a dead-point at one end of the said shaft—that is, should the bar $a$ be in a right line with the centers of said shafts—the leverage at the other end would be in its most advantageous position, thus obviating all difficulty in starting the machine.

Directly beneath each of the hoppers H H there is fixed upon the shaft $h$ a seed-cylinder marked L, which revolves in a tight circular box marked $g$. As the machine moves along, the seed-cylinders revolve directly beneath the apertures in the bottom of the hoppers, and are provided at suitable distances apart with small cells marked $v$, which are of such a capacity as to contain enough corn for a single hill. Thus as the said cells, by the revolutions of the seed-cylinders L, pass successively beneath the openings in the bottom of the hoppers, they are charged with corn sufficient for a hill, which is carried around until the said cells reach the lower part of said box $g$, when they discharge themselves through the openings $e'$ into the tubes $e$, which deposit the corn in the ground. Attached to the lower part of the box $g$, surrounding the seed-cylinders aforesaid, by means of a pivot, as shown in the drawings, and in such a manner as to bring them directly beneath the opening $e'$ in said circular box, is a removable tube with a drill-point attached, constructed substantially as shown. Thus as the drill-point extends only a short distance below the lower extremity of the tube $e$ the corn is dropped with precision at the required point, and is also deposited at the bottom of the furrow or drill. To prevent the corn from falling within too small a space, however, there is attached to the drill-point, directly below the opening of the said tube, and extending backward beneath the same, a horizontal pin, (marked *p* in the drawings,) which is of a triangular form, with its edge or angle above, and having the end beveled off behind, so as to scatter the corn which drops through the tube upon it. There are also arranged on each side of and just behind the tubes *e* the removable plows or shares marked *i i*, which are attached to the frame-work of the machine by pivots in the same manner that the tube *e* is attached to the box *g*. The function of these plows is to cover the corn which has previously been deposited through the tubes *e* in the drills or furrows, as aforesaid. These plows *i i*, being suspended upon pivots, as before described, may be pressed forward, so as to raise them clear from the ground, but are kept in the proper vertical position, when in use, by shoulders projecting behind. Behind these shares *i i*, extending laterally across the machine, there is a rod provided at the points immediately behind said shares with the pins or arms marked *n*. The end of said lateral rod outside of its supports is bent so as to form a crank, as shown at *o*, which is connected by the bar *m* to the lower end of the lever *b*, so that the driver, seated upon the seat S, by moving the lever *b*, presses the arms *n* against the shares *i i*, thus throwing their points forward and upward, and raising them clear from the ground when desirable. The lever *b* is kept in position by means of a pin passing through said lever and the arc *l*.

D D represent two adjustable vertical posts whose front surfaces are provided with cogs matching with those on the wheel F. The lower extremities of said vertical posts are provided with the small wheels or rollers marked D′, and behind said posts are the standards marked I I, upon which the said posts slide up and down; or the friction may be essentially diminished by the employment of the small anti-frictional rollers marked *k k*, as shown in the drawings. The shaft *f*, upon which the cogged wheels F are fixed, is curved up at each end and fastened to the ends of the bar E. By this arrangement, when the driver desires to turn around, which cannot well be done upon the roller C, he reaches forward and grasps the bar E and moves it back over the arc G, thereby revolving the wheels F and sliding the vertical posts D D downward, so that the machine will be supported, not upon the roller C, but upon the wheels D′ D′, when the machine can readily be turned about, and the bar E, being moved back to its original position, is then confined to the arc G by means of the spring-catch K, or any suitable device, when the machine is again ready for use.

At each end of the roller C the pins *d* are fixed, upon the circumference thereof, so arranged as to measure the proper distances between the hills, as determined by the cells *v* in the seed-cylinders L, hereinbefore described, and to mark the ground in a line with the hills deposited by the dropping device hereinbefore mentioned, thereby designating clearly the position of each hill in the next row to be planted, the roller being of such length as to make the distance between the said mark and the adjacent hill already planted the same as the distance between the two dropping-tubes of the machine, so that when the machine returns across the field, by correctly adjusting the machine, upon setting out, to the marks so made by the pins *d*, as aforesaid, the field may be planted in check-rows without the trouble of checking it off preparatory to planting the same.

When my improved corn-planter is being moved from place to place the tube *e* may be removed and the plows *i i* thrown up by the arms *n*, operated as shown and described, so as to avoid being injured by coming in contact with any obstructions or irregularities of the ground over which the machine is moved.

Having thus described my improved automatic corn-planter, I will now specify particularly what I claim as my invention and desire to secure by Letters Patent—

1. The adjustable shares *i i*, constructed, arranged, and operating as and for the purposes herein specified.

2. The combination and arrangement of the crank-shaft *o*, provided with the arms *n*, the lever *b*, and connecting-rod *m*, for the purposes shown and set forth.

3. The removable combined tube and drill-point *e*, provided with the pin *p*, in combination with the hopper of a corn-planter, substantially as herein shown and described.

4. The combination and arrangement of the roller C, provided with the pins *d*, the crank-shafts *h* and *c*, the connecting-bar *a*, seed-cylinders L L, and combined tube and drill-point *e*, constructed and operating as and for the purposes herein described.

WM. F. BLANDIN.

Witnesses:
W. E. MANS,
A. C. BALLARD.